United States Patent
Pfeifle et al.

(10) Patent No.: US 10,289,636 B2
(45) Date of Patent: May 14, 2019

(54) VIRTUAL TABLE GENERATOR FOR ANALYZING GEOGRAPHIC DATABASES

(75) Inventors: Martin Pfeifle, Seewald (DE); Jan Richter, Idstein (DE); Alexander Barthel, Bad Camberg (DE)

(73) Assignee: HERE Global B.V., Eindhoven (NL)

( * ) Notice: Subject to any disclaimer, the term of this patent is extended or adjusted under 35 U.S.C. 154(b) by 325 days.

(21) Appl. No.: 13/017,323

(22) Filed: Jan. 31, 2011

(65) Prior Publication Data

US 2011/0196890 A1     Aug. 11, 2011

Related U.S. Application Data (60) Provisional application No. 61/302,327, filed on Feb. 8, 2010.

(51) Int. Cl.
   *G06F 7/00*          (2006.01)
   *G06F 16/29*        (2019.01)
   *G06F 16/28*        (2019.01)

(52) U.S. Cl.
   CPC ............ *G06F 16/29* (2019.01); *G06F 16/289* (2019.01)

(58) Field of Classification Search
   CPC ...................................................... G06F 16/289
   USPC .................................................. 707/713, 609
   See application file for complete search history.

(56) References Cited

U.S. PATENT DOCUMENTS

| | | | |
|---|---|---|---|
| 5,799,310 A | 8/1998 | Anderson et al. ............ 707/102 |
| 6,263,379 B1* | 7/2001 | Atkinson ................ G06F 9/465 719/332 |
| 6,324,533 B1 | 11/2001 | Agrawal et al. ................... 707/3 |
| 6,356,946 B1* | 3/2002 | Clegg ...................... G06F 9/465 709/231 |
| 6,421,727 B1* | 7/2002 | Reifer ................ H04B 7/18567 709/203 |
| 7,194,477 B1* | 3/2007 | Bradley ................... G06Q 30/02 |
| 7,739,311 B2* | 6/2010 | Smith .................. G06K 9/6253 707/802 |
| 7,921,076 B2* | 4/2011 | Hoang .................... G06F 16/10 707/609 |
| 8,352,391 B1* | 1/2013 | Kapadia .............. H04L 63/0263 706/14 |

(Continued)

FOREIGN PATENT DOCUMENTS

| | | | |
|---|---|---|---|
| EP | 1898301 | 8/2007 | ............. G06F 3/06 |
| WO | WO 2007/088088 | 8/2007 | ............. G01C 21/32 |

OTHER PUBLICATIONS

European Patent Application Serial No. 11153573.8, Extended Search Report dated May 25, 2011.

(Continued)

*Primary Examiner* — Eliyah S. Harper
(74) *Attorney, Agent, or Firm* — Alston & Bird LLP (57) ABSTRACT

A method and system for accessing database tables that contain binary large objects (BLOBs) is disclosed. The method includes encapsulating BLOB-based tables with virtual tables, which allows a user to access the content of the BLOBs via SQL. In one example, the virtual table has a generic table structure that consists of columns (e.g., class name, field name, and field value) and information regarding what level of an object hierarchy contains an element. In another example, a user can define the structure of the virtual table by identifying which object attributes to report.

19 Claims, 5 Drawing Sheets

(56) References Cited

U.S. PATENT DOCUMENTS

| | | | | |
|---|---|---|---|---|
| 8,634,796 | B2* | 1/2014 | Johnson | H04W 4/02 455/404.1 |
| 8,639,267 | B2* | 1/2014 | Johnson | H04W 4/02 455/456.3 |
| 8,977,631 | B2* | 3/2015 | Sundaresan | G06Q 30/02 707/750 |
| 9,219,774 | B2* | 12/2015 | Jolfaei | H04L 67/02 |
| 2001/0037417 | A1* | 11/2001 | Meyer | G06F 8/76 719/332 |
| 2001/0049693 | A1 | 12/2001 | Pratt | 707/200 |
| 2005/0154714 | A1* | 7/2005 | Yu et al. | 707/3 |
| 2005/0234986 | A1* | 10/2005 | Terek et al. | 707/104.1 |
| 2006/0294062 | A1* | 12/2006 | Folchetti et al. | 707/3 |
| 2007/0094041 | A1* | 4/2007 | Coale | G06F 3/04815 345/419 |
| 2009/0030606 | A1* | 1/2009 | Pfeifle et al. | 701/209 |
| 2009/0063453 | A1 | 3/2009 | Adler et al. | 707/5 |
| 2009/0187610 | A1* | 7/2009 | Guo | 707/203 |
| 2010/0094804 | A1 | 4/2010 | Pfeifle et al. | 707/609 |
| 2011/0046876 | A1* | 2/2011 | Pan | G01C 21/3682 701/533 |

OTHER PUBLICATIONS

Davis, Judith R.,"IBM's DB2 Spatial Extender: Managing Geo-Spatial Information within the DMBS", pp. 1-23, XP-002574783, dated May 1998; http://www09.sigmod.org/disc/disc99/disc/ibm/spatial.pdf?searchterm=db2+load.

Reinwald et al., "Heterogeneous Query Processing through SQL Table Functions", Data Engineering, Proceedings, 15$^{th}$ International Conference on Sydney, NSW, Australia, Mar. 23-26, 1999. Los Alamitos, CA, IEEE Comput. Soc., pp. 366-373, XP010326197, ISBN 9780-7695-0071-3.

Extended European Search Report, May 25, 2011, pp. 1-10.

Reinwald, et al. "Heterogeneous Query Processing through SQL Table Functions." IBM Almaden Research Center, 1999 (8 pages).

Davis. "IBM's DB2 Spatial Extender: Managing Geo-Spatial Information Within the DBMS." XP-002574783, May 1998 (25 pages).

European Patent Office, Communication pursuant to Article 93(3) EPC for Application No. 11153573.8, Oct. 2, 2018, 8 pages, Germany.

* cited by examiner

VIRTUAL TABLE GENERATOR FOR ANALYZING GEOGRAPHIC DATABASES

REFERENCE TO RELATED APPLICATIONS

This application claims the benefit of U.S. Provisional Patent Application No. 61/302,327 filed Feb. 8, 2010 and entitled "VIRTUAL TABLE GENERATOR FOR ANALYZING NAVIGATIONAL DATABASES." The full disclosure of U.S. Provisional Patent Application Ser. No. 61/302,327 is incorporated herein by reference.

FIELD

The present invention relates generally to binary large objects (BLOBs), and more particularly, relates to accessing database tables containing BLOBs.

BACKGROUND

A Binary Large Object (BLOB) is a collection of binary data stored as a single entity. BLOBs typically contain image, audio, or other multimedia data. Navigation system vendors may also store map data in BLOBs.

The Navigation Data Standard (NDS) describes storing map data in a relational database. The relational database includes one or more tables that include an identifier, attributes, and a BLOB for each record in the table. Using relational databases to store BLOBs has the advantage of simplifying data access by using Structured Query Language (SQL). SQL is a database computer language designed for managing data in relational database management systems (RDBMS).

For testing proprietary navigational databases, NDS specifies encapsulating a set of BLOB-based tables with a set of hard-coded virtual tables. The hard-coded virtual tables are created in a loadable SQLite module. The loadable SQLite module may be regarded as a database access library allowing data to be read from the hard-coded virtual tables using SQL. However, like other database access libraries, if the underlying database format changes, so does the implementation of the SQLite module. For example, if a database is extended, e.g., to include new tables and/or columns, the SQLite module also needs to be extended. As a result, if there are three database versions, three SQLite modules are also needed to access data from each of the database versions.

Therefore, it would be beneficial to have an easier way of accessing different database versions. This would be especially useful in a testing program designed to analyze data differences between the different database versions.

SUMMARY

A method and system for accessing database tables that contain binary large objects (BLOBs) is disclosed. In one example, a method includes receiving a query from an application for data stored as a binary large object in a physical table. The query includes parameters for interpreting the binary large object and a mode for retrieving data from the binary large object. The method further includes retrieving the binary large object from the physical table; creating a virtual table using the binary large object, the parameters, and the mode; and providing the virtual table as a response to the query.

As another example, a system is a virtual table generator and the generator includes a first module and a second module. The first module has a physical table that stores binary large objects. When the first module receives a query, the first module retrieves a binary large object from the physical table and provides the object to the second module. The second module generates a virtual table containing data responsive to the query and provides the virtual table to the first module. The first module then provides the virtual table as a response to the query.

These as well as other aspects and advantages will become apparent to those of ordinary skill in the art by reading the following detailed description, with reference where appropriate to the accompanying drawings. Further, it is understood that this summary is merely an example and is not intended to limit the scope of the invention as claimed.

BRIEF DESCRIPTION OF THE DRAWINGS

Presently preferred embodiments are described below in conjunction with the appended drawing figures, wherein like reference numerals refer to like elements in the various figures, and wherein.

DETAILED DESCRIPTION

Figure 1:
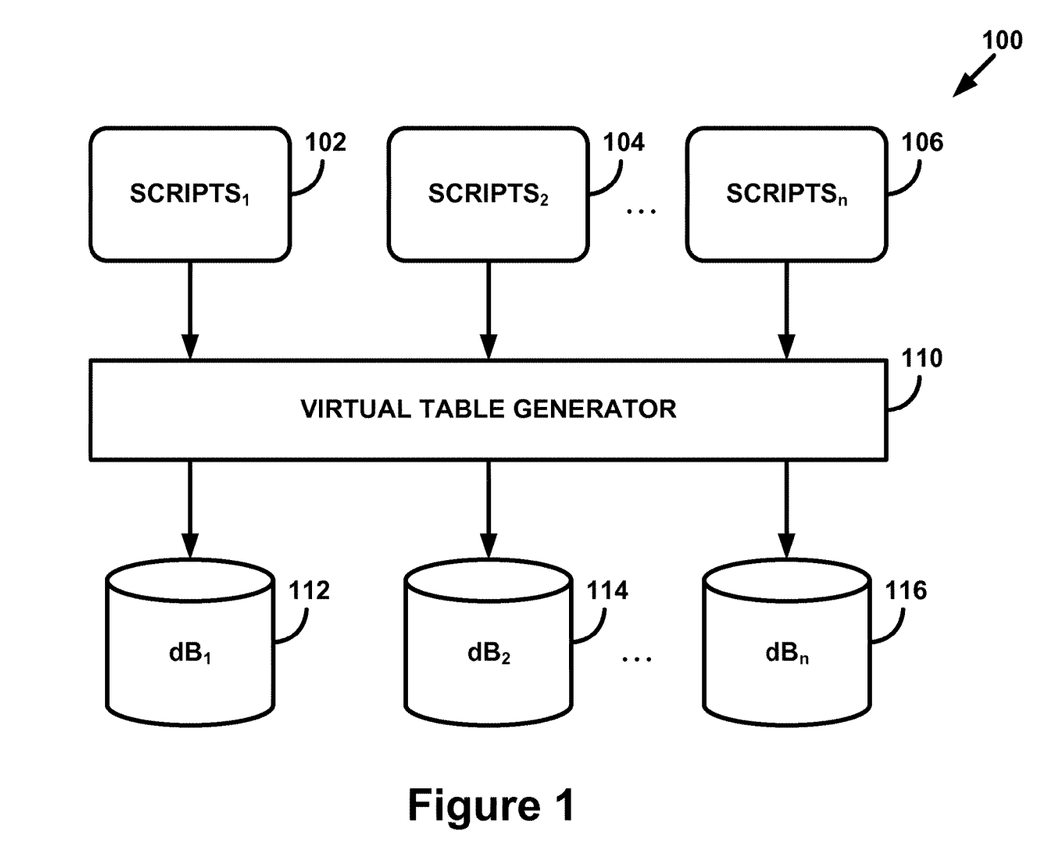
FIG. 1 is a block diagram depicting a single SQLite module for accessing multiple database versions, according to an example.

FIG. 1 is a block diagram 100 depicting a single virtual table generator 110 (i.e., a single SQLite module) located between scripts 102-106 (e.g., SQL scripts) and databases 112-116. Beneficially, the single virtual table generator 110 is used for any number of script-database pairs. Thus, while three pairs are shown in FIG. 1, it is understood that the single virtual table generator 110 may be used with greater or less than three script-database pairs.

The virtual table generator 110 is a generic module that creates virtual tables via an SQL-interface. A virtual table is an object that is registered with an open SQLite database connection. SQLite is a software library that implements a self-contained, serverless, zero-configuration, transactional SQL database engine. From the perspective of an SQL statement, a virtual table object looks like any other table or view, but behind the scenes, queries from and updates to a virtual table invoke callback methods on the virtual table object instead of reading and writing to the database file. The virtual table mechanism allows an application to publish interfaces that are accessible from SQL statements as if they were tables.

The scripts 102-106 include virtual table definitions for the databases 112-116, respectively. The scripts 102-106 may also include test cases for the databases 112-116. The scripts 102-106 may be written using Relational DataScript (RDS) or another appropriate language. RDS is a language extension that allows storing data in an SQL database, either in base type columns or in BLOBs.

The databases 112-116 may be any type of database. For purposes of the following discussion, the databases 112-116 are geographic databases from one or more navigation system vendors. Typically, each navigation system vendor has a proprietary database. Additionally or alternatively, the databases 112-116 may be different versions of a database from the same system vendor.

The data in the databases 112-116 are organized in a relational database, which is described in a structured language, such as RDS. Each BLOB is stored in one separate record along with a record identifier and attributes that describe the content of the BLOB. Because the BLOBs are described in a structured language, the scripts 102-106 can be automatically generated for reading to and writing from the BLOBs.

Figure 2:
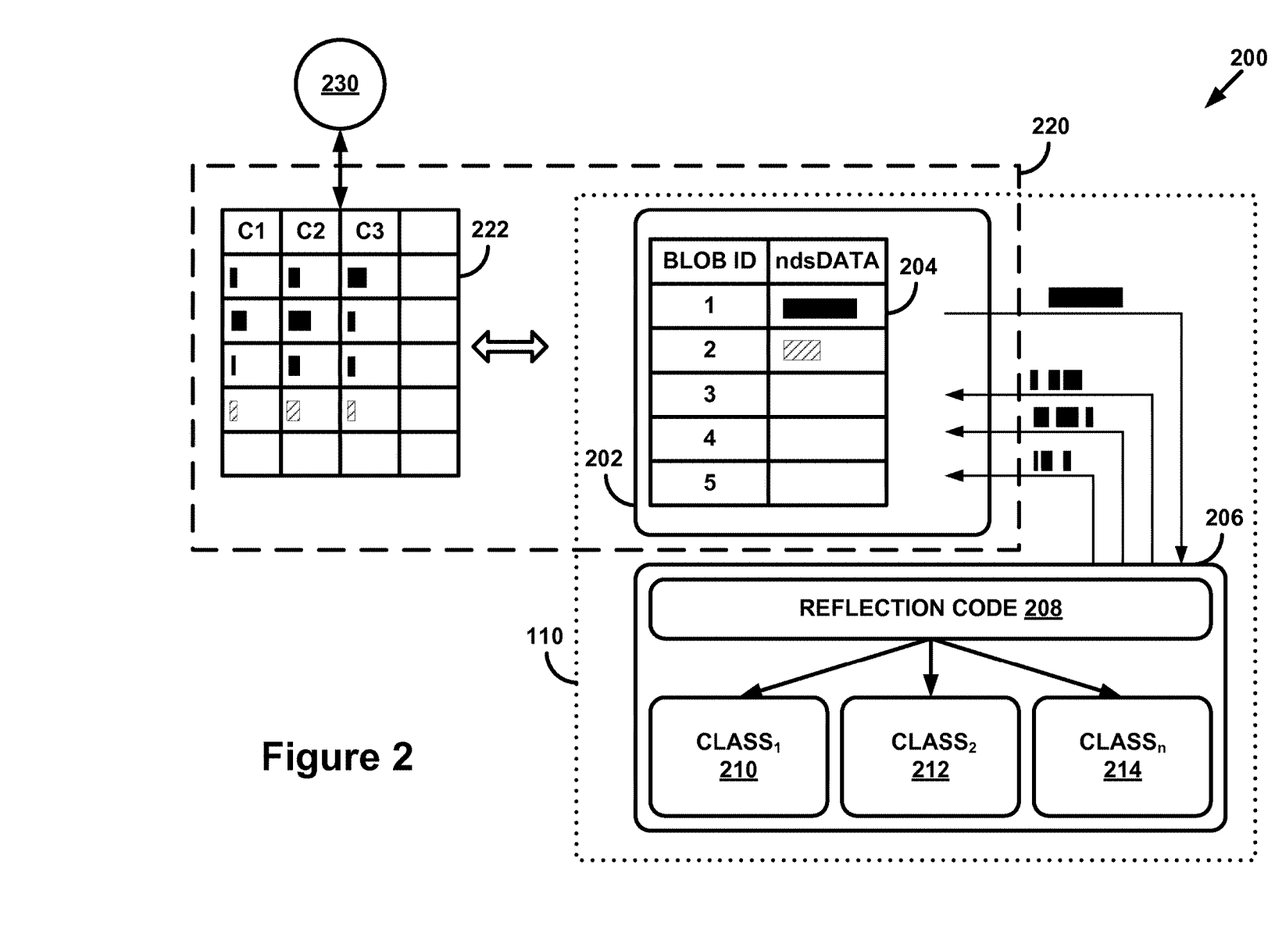
FIG. 2 is a block diagram depicting the virtual table generator depicted in FIG. 1 with a database system, according to an example.

FIG. 2 is a block diagram 200 depicting how the virtual table generator 110 (delineated with a dotted line) depicted in FIG. 1 interacts with a database system 220 (delineated with a dashed line). The database system 220 is a relational database management system (RDBMS). While this description uses the example of SQLite, other RDBMSs, such as Postgres, may be used. As shown in FIG. 2, the database system 220 includes a virtual table 222, which is generated by the virtual table generator 110.

The virtual table generator 110 includes a BLOB provider module 202 and a BLOB analyzer module 206. Generally, the provider module 202 communicates with the SQLite engine by implementing a standardized virtual table interface, and the analyzer module 206 analyzes the BLOB based on reflection and returns the object hierarchy in a relational way.

The provider module 202 includes a physical table 204. The physical table 204 includes BLOB identifiers (BLOB ID) and associated BLOBs. The BLOB ID is a primary key. The primary key of a relational table uniquely identifies each record in the table. The physical table 204 may also include attributes associated with the BLOB.

The analyzer module 206 of the virtual table generator 110 includes reflection code 208 and classes 210-214. Reflection is the process by which a computer program can observe and modify its own structure and behavior at runtime. A class is a construct that is used as a template to create objects of that class. The template describes the state and behavior that the objects of the class all share. The reflection code 208 allows runtime retrieval of available attributes from the classes 210-214. Generally, the analyzer module 206 transforms an object tree (see, e.g., FIG. 5) into a table object (see, e.g., Tables 2 and 3) containing available values.

To perform this transformation, the analyzer module 206 examines the current BLOB in memory for methods. A method is a group of instructions that is given a name and can be called in a program by specifying the name. Specifically, the analyzer module 206 searches for methods with the prefix "get," "is," and so on that have no parameter. For each method found, the analyzer module 206 invokes the method to obtain a result object. The analyzer module 206 then examines the result object.

If the result object has an object handler class, the analyzer module 206 uses that class to represent the value. If the result object is a primitive data type, the analyzer module 206 uses the primitive data type to represent the value. If the result object has no associated object handler class and is not a primitive data type, the methods for this object with the prefix "get," "is," and so on are invoked. Thus, the object tree is recursively traversed until primitive data types or object handler classes are found.

Figure 3:
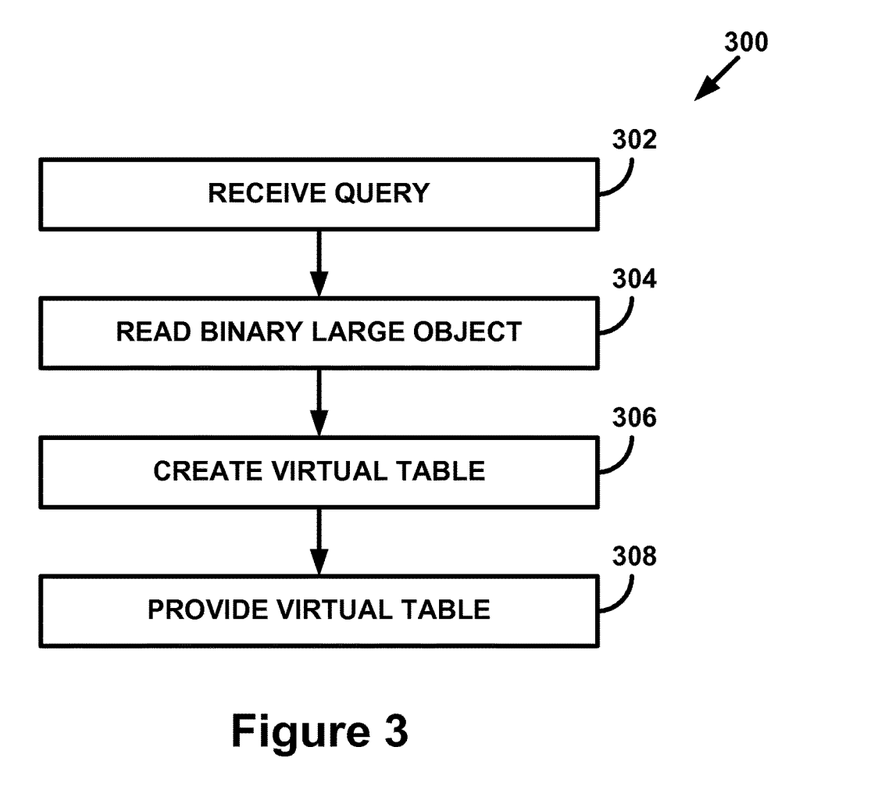
FIG. 3 is a flow chart for a method of accessing a binary large object, according to an example.

FIG. 3 depicts a flow chart 300 of a method for accessing BLOB data. A processor may execute the method 300. The processor may include one or more general purpose processors and/or special purpose processors. The method 300 may be coded as computer-readable program instructions stored in a data storage device. The data storage device may be the same or a different device than the data storage device containing the virtual table generator 110 and/or the database system 220.

At block 302, the BLOB access process starts with a query from an application 230 requesting data from one of the databases 112-116 using the scripts 102-106. For example, the application 230 may be a navigation application (e.g., map display, route calculation, and/or route guidance applications) requesting geographic data from a geographic database. As another example, the application 230 may be a test routine that compares data in two or more different databases (i.e., different versions and/or vendors). In the geographic database example, geographic data is stored as a BLOB in the physical table 204.

The geographic data contains data that represents the road network in the region, such as the locations (geographic coordinates, including altitude) of roads and intersections, road names, speed limits along roads, turn restrictions at intersections, addresses or address ranges along roads, the number of lanes, lane width, lane markings, functional classes, the locations of medians, and so on. The geographic data may also contain information about other geographic features, such as bodies of water, parks, administrative areas (including municipal, state, and country boundaries), and locations of points of interest, such as businesses, hospitals, police stations, and so on.

Figure 4:
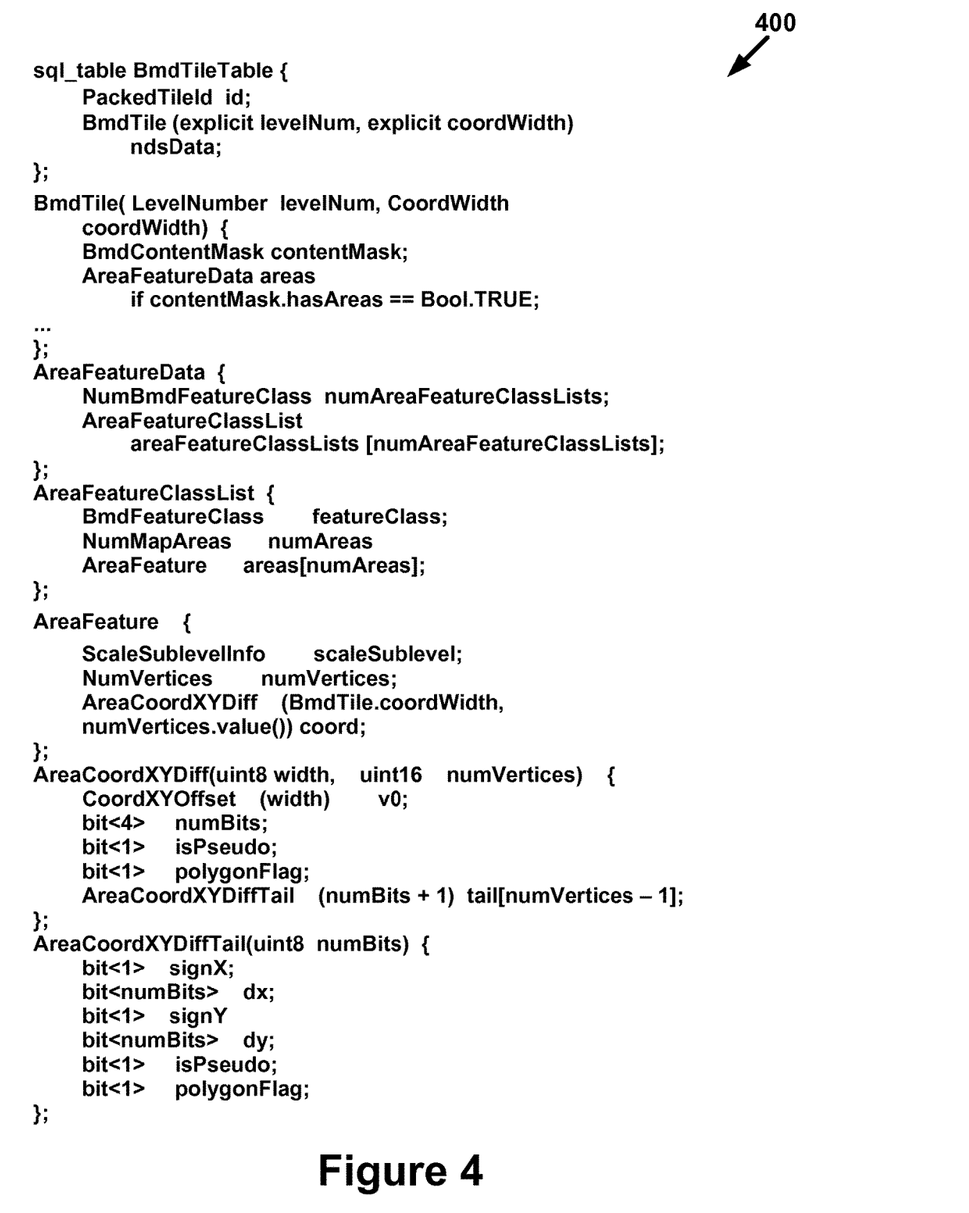
FIG. 4 depicts RDS language defining a physical table in the virtual table generator depicted in FIG. 1, according to an example.

The query includes parameters for interpreting the content of the BLOB. As one example, the structure of the BLOB maybe defined in the RDS language 400 as shown in FIG. 4. In this example, the parameters used for interpreting the content of the BLOB are class name (e.g., BMDTile) and further parameters necessary for interpreting a BLOB by a given class (e.g., levelNum and coordWidth). The class name defines the top level structure of the analyzer module 206 that should be used for analyzing the BLOB. The following parameters (e.g., levelNum and coordWidth) are constructor parameters for the class defined by the first parameter and are necessary for interpreting a BLOB correctly by this class.

The query also specifies a mode for retrieving the data. For example, the virtual table generator 110 may operate in ROW mode or COLUMN mode. These modes are further described with respect to creating a virtual table at block 306.

At block 304, the provider module 202 reads a BLOB from the physical table 204 and provides the BLOB and configuration information to the analyzer module 206. The configuration information includes the class name, the further constructor parameters, and the mode type.

At block 306, the analyzer module 206 analyzes the BLOB and creates a virtual table. The analyzer module 206 uses the reflection code 208 to iterate through the object hierarchy by calling getters or using specific object handlers. If the analyzer module 206 uses specific object handlers (e.g., AreaHandler), the getters of those classes are used rather than the default getters.

The analyzer module 206 retrieves row data based on the mode specified by the query. The two modes, ROW and COLUMN, are described using the example depicted in FIGS. 4 and 5 where the physical table 204 has the structure BMDTileTable(ID integer, ndsDATA BLOB). The BMDTileTable is a physical SQLite table having the columns: ID and ndsDATA.

Figure 5:
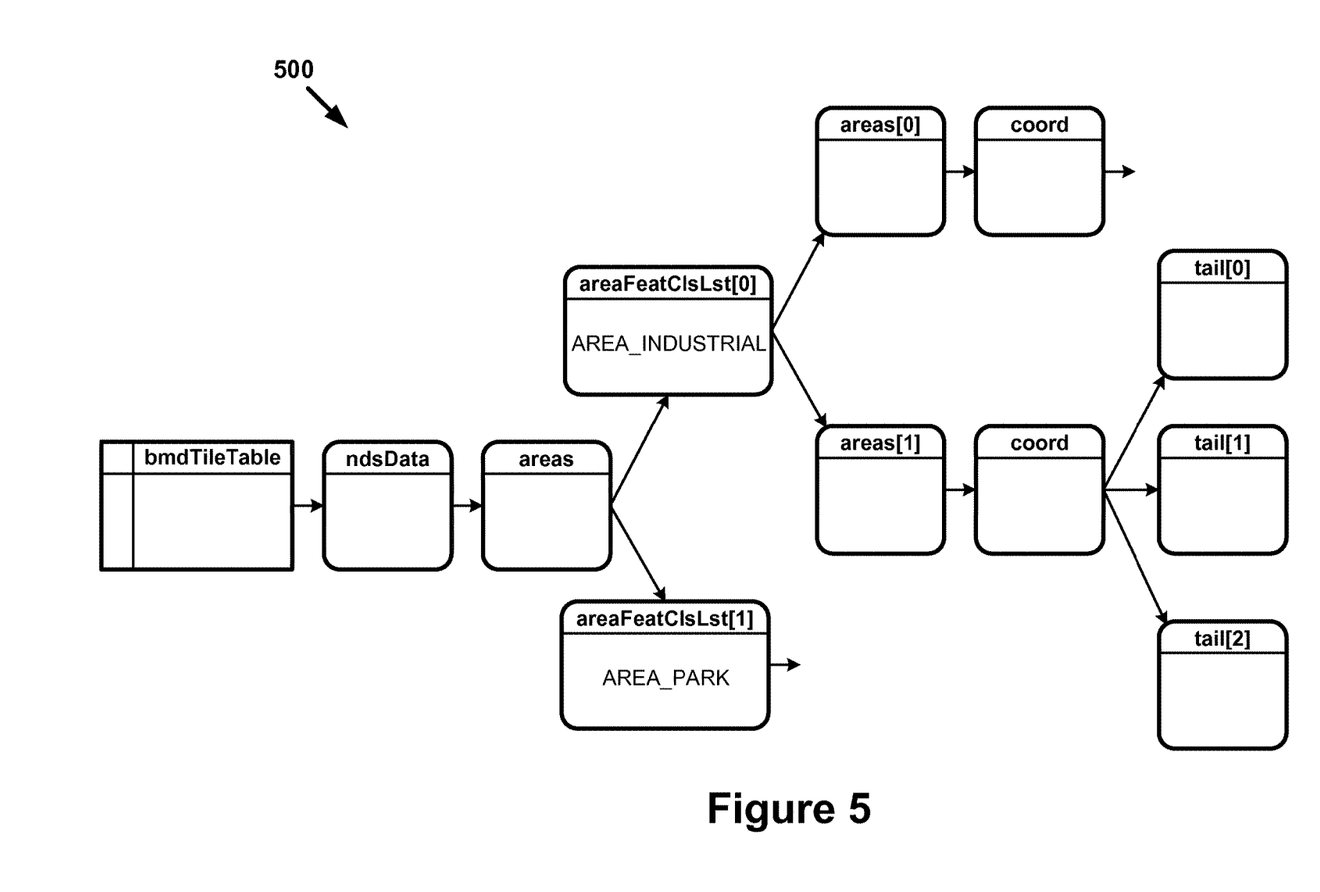
FIG. 5 is a block diagram of an object tree associated with the RDS language depicted in FIG. 4, according to an example.

For each row in the physical table 204, the identifier data is an integer value and the ndsDATA data is a BLOB. The BMD tile structure includes a list of area features, which consists of lists of areas belonging to a specific feature class. Each area includes a list of points. An object tree 500 for this example is shown in FIG. 5.

In ROW mode, the analyzer module 206 returns a fixed table structure to the provider module 202. The fixed table structure is not defined by the SQL scripts 102-106. Instead, the provider module 202 determines which primary keys to use in the primary key column (first column of the virtual table) and the analyzer module 206 returns the data for the primary keys for a predetermined set of columns.

For example, a user of the application 230 may define the virtual table 222 (vBMDTileTable) using the following script.

```
CREATE VIRTUAL TABLE vBMDTileTable USING VtGenerator (
SRC_TAB(BMDTileTable),
```

The columns of the vBMDTileTable are partly created by the provider module 202 and partly by the analyzer module 206. The provider module 202 automatically derives the primary key columns of the physical table 204 (BMDTileTable) and the analyzer module 206 returns a set of fixed columns as shown in Table 1, as an example.

TABLE 1

| COLUMN | FORMAT | CONTENTS |
|---|---|---|
| Index | Integer | Array index of the current object, if applicable |
| Hierarchy Level | Integer | Level in the object hierarchy |
| Type | String | Full java class name |
| Name | String | Field name |
| Value | String | Numerical or string value of the field for leaf nodes in the object tree |

With the provider module 202 deriving the primary key of "4711" and the analyzer module 206 using the defined set of columns listed in Table 1, the virtual table 222 may look like the example provided in Table 2.

TABLE 2

| ID | INDEX | HIERARCHY LEVEL | TYPE | NAME | VALUE |
|---|---|---|---|---|---|
| 4711 | 1 | 4 | nds.bmd.areas.AreaFeature | areas | |
| 4711 | 1 | 5 | nds.bmd.areas.AreaFeature.ScaleSublevelInfo | scaleSublevel | 10 |
| 4711 | 1 | 5 | nds.bmd.areas.AreaFeature.NumVertices | numVertices | 100 |
| 4711 | 1 | 5 | nds.bmd.areas.AreaFeature.AreaCoordXYDiff | coord | |
| 4711 | 1 | 6 | | numBits | 3 |
| 4711 | 2 | 4 | nds.bmd.areas.AreaFeature | areas | |
| ... | | | | | |

```
-continued
SRC_BLOB(ndsData),
SRC_LIB(./lib/rds_20.jar),
MODE(ROW),
    CONSTRUCTOR(10,12)
);
```

This script instructs the provider module 202 of the virtual table generator 110 (VtGenerator) to read ndsData from the physical table 204 (BMDTileTable). The provider module 202 instructs the analyzer module 206 to create a table object from the BLOB ndsData by using the classes 210-214 from a specified code repository (i.e., ./lib/rds_20.jar).

The constructor of the classes 210-214 is invoked with the two parameters levelNum and coordWidth. For example, the two parameters levelNum and coordWidth may have the values of 10 and 12 as seen in the previous script. These two parameters are needed so that the BLOB ndsData can be interpreted correctly by the class BMDTile. The class name BMDTile is derived from the RDS description 400 of the table BMDTileTable.

In the COLUMN mode, a user of the application 230 defines what columns to use in the virtual table 222. The user defines the table structure using the SQL scripts 102-106. For example, the user may request columns "areaFeatureClassLists," "areas," "coord," and "tail" with the following script:

```
CREATE VIRTUAL TABLE vBMDTileTable USING VtGenerator (
SRC_TAB(BMDTileTable),
SRC_BLOB(ndsData),
SRC_LIB(./lib/rds_20.jar),
MODE (COLUMN, areaFeatureClassLists(INDEX,featureClass),
areas(INDEX), coord(numBits), tail(INDEX, dx, dy)),
CONSTRUCTOR(10,12)
);
```

In response to this script, the provider module 202 adds the primary key column and the analyzer module 206 adds the user specified columns to the virtual table 222. The virtual table 222 may look like the example provided in Table 3.

TABLE 3

| ID | areaFeatureClassList index | featureClass | areas index | numBits | tail index | dx | dy |
|---|---|---|---|---|---|---|---|
| 12321 | 0 | industrial | 0 | 5 | 0 | 1 | 11 |
| 12321 | 0 | industrial | 0 | 5 | 1 | 22 | 123 |
| 12321 | 0 | industrial | 0 | 5 | 2 | 3 | 12 |
| 12321 | 0 | industrial | 1 | 5 | 0 | 44 | 121 |

TABLE 3-continued

| ID | areaFeatureClassList index | featureClass | areas index | numBits | tail index | dx | dy |
|---|---|---|---|---|---|---|---|
| 12321 | 0 | industrial | 1 | 5 | 1 | 122 | 14 |
| 12321 | 0 | industrial | 1 | 5 | 2 | 144 | 14 |
| 12321 | 1 | park | 0 | 6 | 0 | 1 | 1 |

At block 308, the virtual table generator 110 provides a table of results to the application 230. For example, the virtual table generator 110 may return a table similar to Table 2 or 3. The application 230 may query the virtual table 222 (e.g., Table 2 or 3) as if it was a physical table. For example, the application 230 may query Table 2 with the following SQL command.

```
SELECT ID, Index, HierarchicalLevel, Name, Value FROM
vBMDTileTable
WHERE Value is not NULL
```

The result of this query is shown in Table 4.

TABLE 4

| ID | INDEX | HIERARCHY LEVEL | TYPE | NAME | VALUE |
|---|---|---|---|---|---|
| 4711 | 1 | 5 | nds.bmd.areas.AreaFeature.ScaleSublevelInfo | scaleSublevel | 10 |
| 4711 | 1 | 5 | nds.bmd.areas.AreaFeature.NumVertices | numVertices | 100 |
| 4711 | 1 | 6 |  | numBits | 3 |

The database system 220 provides the results shown in Table 4 to the application 230.

Encapsulating BLOB based physical tables in virtual tables allows SQL access to BLOB content. Rather than defining the virtual tables in a hard-coded way, both the ROW mode and the COLUMN mode provide easier access to BLOBs stored in databases. The programming paradigm of reflection allows the retrieval of a list of available attributes for arbitrary objects/classes at runtime. As a result of database content changes, only the SQL scripts need to be modified, which is much easier than adapting c-code to changes in the databases.

By using the described approach, it is possible to express test cases in SQL. For example, the application 230 may query the virtual table 222, such as Table 3 (vTable3), to test no areas consist of more than 100 points by using the following script.

SELECT 1 FROM vTable3 WHERE tailindex>100

If the query returns no results, the test passed; otherwise, the test failed. Furthermore, tests can be expressed that compare the content of two BLOBs to each other by using SQL. The technique can also be used to test referential integrity of the BLOB content. In many BLOBs, references to other BLOB parts are contained. If all data of a BLOB is represented by virtual tables, it can be checked whether the references are valid by using SQL.

It is intended that the foregoing detailed description be regarded as illustrative rather than limiting and that the following claims including all equivalents define the scope of the invention. For example, while the description provided examples using SQL and SQLite, it is understood that other languages and database management systems may be used. As another example, while the description provided examples of BLOBs containing geographic data, it is understood that other data may be stored in BLOBs. The claims should not be read as limited to the described order or elements unless stated to that effect. Therefore, all embodiments that come within the scope and spirit of the following claims and equivalents thereto are claimed as the invention.

We claim:

1. A computer-implemented method of accessing binary large objects in a geographic database, comprising:
   receiving, at a processor, a navigation query from an application for data stored as one of a plurality of binary large objects in a physical table, wherein each of the plurality of binary large objects is stored in a separate record in the geographic database;
   retrieving, by the processor, the binary large object from the physical table stored in the geographic database;
   providing, via the processor, the binary large object to an analyzer;
   analyzing the binary large object at runtime by executing the analyzer with the processor, wherein the analyzer uses a reflection code which operates (a) in a plurality of modes to identify primitive data types or object handlers by searching for getters in the binary large object, (b) modifies its own structure at runtime based on an object tree of the binary large object, and (c) the analyzing comprises:
      identifying, by the processor, one or more methods having one of one or more predetermined prefixes in the binary large object,
      invoking, by the processor, a first method of the one or more methods to obtain a result object,
      determining, by the processor, whether the result object has an object handler class or is a primitive data type,
      responsive to determining that the result object has the object handler class, using, by the processor, a class corresponding to the object handler class to represent a value for the first method,
      responsive to determining that the result object is a primitive data type, using, by the processor, the primitive data type to represent the value for the first method, and
      responsive to determining that the result object neither has the object handler class nor is a primitive data type, invoking, by the processor, a method of the result object,
   wherein the analyzing causes multiple object classes to be recursively traversed using the predetermined prefixes until the primitive data types or an object handler class are identified by the reflection code executed by the processor using the getters to retrieve row data for a virtual table, wherein the virtual table connects each of a plurality of geographic databases to a respective one of a plurality of scripts;

modifying the virtual table at runtime in response to the navigation query by the processor based on the object tree of the binary large object, the virtual table including data which corresponds to a mode of the plurality of modes, wherein the plurality of modes are a predetermined number of options for retrieving data from the binary large object in a particular order;

providing, using the processor, the virtual table to the application; and accessing, using the application via the processor, the virtual table for data from the binary large object as stored in the virtual table as a response to the navigation query in order to perform a function of the application, wherein the navigation query is in structured query language and includes parameters for interpreting the binary large object and a mode used by the reflection code for retrieving data from the binary large object.

2. The method of claim 1, wherein the application is a navigation application.

3. The method of claim 1, wherein the application is a test routine.

4. The method of claim 1, wherein the data is geographic data.

5. The method of claim 1, wherein the parameters include a class name.

6. The method of claim 5, wherein the parameters include constructor parameters associated with the class name.

7. The method of claim 1, wherein the mode is ROW mode, and wherein creating the virtual table includes using a predetermined set of columns in the virtual table.

8. The method of claim 1, wherein the mode is COLUMN mode, and wherein creating the virtual table includes using a user specified set of columns in the virtual table.

9. The method of claim 1, further comprising receiving a query of the virtual table.

10. An apparatus comprising:
at least one processor; and
at least one memory including computer program code for one or more programs;
the at least one memory and the computer program code configured to, with the at least one processor, cause the apparatus to at least perform:
receive a navigation query from an application for data stored as a binary large object of a plurality of binary large objects in a physical table, wherein each of the plurality of binary large objects is stored in a separate record in the geographic database;
retrieve the binary large object from the physical table stored in the geographic database;
provide the binary large object to an analyzer;
analyze the binary large object at runtime using the analyzer, wherein (a) the analyzer uses a reflection code which operates in a plurality of modes to identify primitive data types or object handlers by searching for getters in the binary large object, (b) modifies its own structure at runtime based on an object tree of the binary large object, and (c) to analyze the binary large object, the at least one memory and the computer program code are configured to, with the processor, cause the apparatus to at least:
identify one or more methods having one of one or more predetermined prefixes in the binary large object,
invoke a first method of the one or more methods to obtain a result object,
determine whether the result object has an object handler class or is a primitive data type,
responsive to determining that the result object has the object handler class, use a class corresponding to the object handler class to represent a value for the first method,
responsive to determining that the result object is a primitive data type, use the primitive data type to represent the value for the first method, and
responsive to determining that the result object neither has the object handler class nor is a primitive data type, invoke a method of the result object,
wherein the analyzing causes multiple object classes to be recursively traversed using the predetermined prefixes until the primitive data types or an object handler class are identified by the reflection code executed by the processor using the getters to retrieve row data for a virtual table, wherein the virtual table connects each of a plurality of geographic databases to a respective one of a plurality of scripts;
modify a virtual table at runtime in response to the navigation query based on the object tree of the binary large object, the virtual table including data which corresponds to a mode of the plurality of modes, wherein the plurality of modes are a predetermined number of options for retrieving data from the binary large object in a particular order, wherein the virtual table links multiple scripts to multiple geographic databases;
provide the virtual table to the application; and
access the virtual table for data from the binary large object as stored in the virtual table as a response to the navigation query in order to perform a function of the application, wherein the navigation query is in structured query language and includes parameters for interpreting the binary large object and a mode used by the reflection code for retrieving data from the binary large object.

11. The apparatus of claim 10, wherein the application is a navigation application.

12. The apparatus of claim 10, wherein the data is geographic data.

13. The apparatus of claim 10, wherein the mode is ROW mode, and the virtual table includes using a predetermined set of columns.

14. The apparatus of claim 10, wherein the mode is COLUMN mode, and wherein the virtual table includes using a user specified set of columns.

15. A non-transitory computer readable medium including instructions that when executed by a processor are operable to:
receive a navigation query from an application for data stored as a binary large object of a plurality of binary large objects in a physical table, wherein each of the plurality of binary large objects is stored in a separate record in the geographic database;
retrieve the binary large object from the physical table stored in the geographic database;
provide the binary large object to an analyzer;
analyze the binary large object at runtime using the analyzer, wherein (a) the analyzer uses a reflection code which operates in a plurality of modes to identify primitive data types or object handlers by searching for getters in the binary large object, (b) modifies its own structure at runtime based on an object tree of the binary large object, and (c) the analyzing comprises:

identifying one or more methods having one of one or more predetermined prefixes in the binary large object, invoking a first method of the one or more methods to obtain a result object, determining whether the result object has an object handler class or is a primitive data type, responsive to determining that the result object has the object handler class, using a class corresponding to the object handler class to represent a value for the first method, responsive to determining that the result object is a primitive data type, using the primitive data type to represent the value for the first method, and responsive to determining that the result object neither has the object handler class nor is a primitive data type, invoking a method of the result object, wherein the analyzing causes multiple object classes to be recursively traversed using the predetermined prefixes until the primitive data types or an object handler class are identified by the reflection code executed by the processor using the getters to retrieve row data for a virtual table, wherein the virtual table connects each of a plurality of geographic databases to a respective one of a plurality of scripts;

modify a virtual table at runtime in response to the navigation query based on the object tree of the binary large object, the virtual table including data which corresponds to a mode of the plurality of modes, wherein the plurality of modes are a predetermined number of options for retrieving data from the binary large object in a particular order, wherein the virtual table links multiple scripts to multiple geographic databases;

provide the virtual table to the application; and access the virtual table for data from the binary large object as stored in the virtual table as a response to the navigation query in order to perform a function of the application, wherein the navigation query is in structured query language and includes parameters for interpreting the binary large object and a mode used by the reflection code for retrieving data from the binary large object.

16. The non-transitory computer readable medium of claim 15, wherein the application is a navigation application.

17. The non-transitory computer readable medium of claim 15, wherein the data is geographic data.

18. The non-transitory computer readable medium of claim 15, wherein the mode is ROW mode, and the virtual table includes using a predetermined set of columns.

19. The non-transitory computer readable medium of claim 15, wherein the mode is COLUMN mode, and wherein the virtual table includes using a user specified set of columns.

* * * * *